United States Patent Office 3,123,553
Patented Mar. 3, 1964

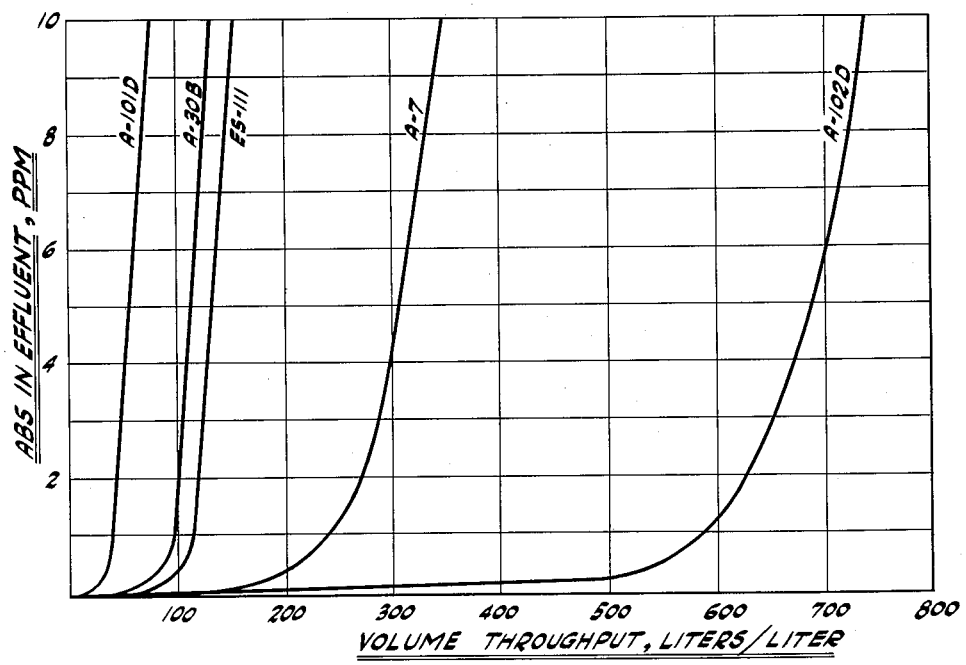

3,123,553
REMOVAL OF ALKYL BENZENE SULFONATE FROM LIQUIDS
Irving M. Abrams, Redwood City, Calif., assignor, by mesne assignments, to Diamond Alkali Company, Cleveland, Ohio, a corporation of Delaware
Filed Sept. 8, 1961, Ser. No. 136,770
8 Claims. (Cl. 210—30)

This invention relates to the removal of alkyl benzene sulfonates dissolved in the liquid phase of aqueous media by insoluble, infusible resinous materials containing basic groups.

Alkyl benzene sulfonates may be defined by the following formula:

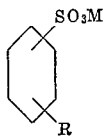

where M generally represents a metallic cation, such as sodium, potassium, calcium, etc., usually sodium, and R represents an alkyl chain of from 8–22 carbon atoms, most frequently from $C_{10}$ to $C_{14}$. These compounds, usually derived from petroleum products, are very commonly used as detergents in household and industrial cleaning formulations. Extremely large quantities are being used in laundering and other similar washing operations.

Current consumption of synthetic detergent washing products is in the range of billions of pounds annually. Because alkyl benzene sulfonates (hereinafter referred to as ABS) cause foaming when present in water, even in concentrations as low as one part per million (p.p.m.), and because these compounds find their way into waste streams, their presence in industrial and municipal waste disposal systems has become a severe nuisance. The problem is aggravated by the fact that ABS compounds are not effectively digested by the microorganisms used for sewage disposal; they may even impair the proper function of activated sludge plants. Frequently, ABS residues are found in water wells located proximate to septic tanks and may give rise not only to foam, but unpleasant tastes as well. Since the method of this invention provides for the removal of these compounds from water, it solves a highly obnoxious and urgent problem.

Comparatively few methods are available or commercially practical for removing ABS from water. These are based on (1) digestion of microorganisms, (2) separation by frothing, or (3) adsorption on a solid. In none of these methods is the removal complete. In the digestive process, as indicated above, removal of ABS is usually ineffective. Separation by frothing can remove up to 84%. In a recent investigation of solid adsorbents for ABS (Charles E. Renn and Mary F. Barada, Journal American Water Works Assn., volume 53, 129–34 (1961)), activated carbon was found to be the most effective of those tested. However, relatively large quantities of this adsorbent were required to remove ABS from waters containing one p.p.m. or more of this ingredient; even large amounts of carbon (more than 100 parts per million parts of water) were not totally effective. Thus, the use of this agent for the removal of ABS in the concentration range of 1 to 10 p.p.m. appears to be too expensive to be practical.

The method of this invention provides for the use of an adsorbent which is considerably more effective than any of those used for the purpose heretofore. Furthermore, the capacity of the adsorbents described herein for the removal of ABS is several times as high as those previously used and the equipment required for using the agents of this invention is simple and readily available.

Thus, objects of this invention, among others, are to provide an improved and simple method for removal from liquids, particularly from waste water solutions, sufficient quantities of alkyl benzene sulfonate to eliminate, or at least, to mitigate the frothing nuisance, and also the impairment of sewage disposal processes. Other objects of the invention will become apparent from the following description.

Summarizing the invention, the process comprises contacting a body of water containing the ABS with a resinous anion-exchange material, desirably in the form of discrete granular particles. The resin can be added to the liquid to form a slurry, the mixture stirred, and thereafter the solids separated from the liquid by filtration or decantation; or, desirably, the solution containing the ABS can be passed through a column or bed of the granular anion-exchange material. Either of these processes can be carried out batchwise or continuously, but the treatment can be intermittent, if desired. However done, it is important to achieve intimate contact between the liquid to be treated and the resin, which removes the undesirable constituent.

Ion-exchange resins have been used previously for the analysis of solutions containing various surface-active agents, commonly referred to as "surfactants"—(see, for example, "Systematic Analysis of Surface-Active Agents," by M. J. Rosen and H. A. Goldsmith, Interscience Publishers, New York, 1960, pp. 42–3, and "New Columnar and Mixed-Bed Ion-Exchange Methods for Surfactant Analysis and Purification," by M. E. Ginn and C. L. Church, Analytical Chemistry, 31, 551–5 (1959)). These methods are concerned only with isolating and purifying small quantities of both cationic and anionic surfactants to allow more accurate analysis of solutions containing these ingredients, and there is no concern regarding capacity of the resin for removing maximum quantities of the surfactant. In the method hereof, it has been unexpectedly found that although the resins employed will remove other anions in the treated liquid as well as ABS, the ABS has a greater affinity or preference for the resin than the salts that are usually contained in water, and will therefore displace other anions simultaneously removed from the liquid, particularly in a column operation, thus rendering the method commercially feasible. Cation exchange resins cannot be employed for removal of ABS.

Thus, when an anion-exchange material is brought into contact with an aqueous solution containing ionic ingredients, there occurs an exchange of ions in the solution for ions on the resin. For example, when an anion-exchange resin in the hydroxide or free-base form comes into contact with a solution containing such negative ions as chloride, sulfate, bisulfate, nitrate, or bicarbonate ions, these ions are either adsorbed by the resin as acids (in the case of weakly basic anion-exchange materials) or exchanged for hydroxide ions (in the case of strongly basic resins). The extent of the exchange is generally governed by the mass action laws, well known in physical chemistry. It is also well known that the extent of the exchange is determined by such factors as the concentration of the ions in solution, the valence of the particular ion in question and diffusion rates.

It would be expected, therefore, that ABS, being a monovalent anion in very dilute solutions, would be extracted by adsorption or exchange in accordance with the well known laws which apply to ion-exchange reactions. However, it was surprisingly discovered that the ABS anion has a much greater affinity for the anion-exchange resins than other anions with which it is generally associated in solution. Thus, in spite of the fact that sulfates and chlorides may be present in concentrations several times as high as the ABS, the latter is removed in preference to the former when a solution containing all three components are contacted by a resin containing basic groups. An important aspect of this invention is, therefore, the unexpected selectivity or preference for ABS over other anions. This insures that the ABS will be completely removed even though it is a minor constituent in the water.

The exact mechanism of the process has not been precisely delineated. The ABS may be extracted by the resin by adsorption of the entire molecule on the resin, or there may be an exchange of the sulfonate for an ion on the resin. Probably both occur. In tests designed to determine which of these mechanisms predominates, an anion-exchange resin in the chloride form was contacted with a solution containing only ABS. It was found that some chloride was given off to the solution, but the exchange was not quantitative.

The particular materials for removing ABS from the liquid are insoluble, infusible resins containing basic groups. These groups may be strongly basic or weakly basic, depending upon the composition of the resinous material. Examples of strongly basic resins are those containing quaternary ammonium, sulfonium, phosphonium, arsonium, or the like, groups. Examples of weakly basic resins are those whose activity is based upon their content of primary, secondary, or tertiary amines, or weakly basic groups based on sulfur, phosphorous, or the like.

Strongly basic resins whose activity is derived from quaternary ammonium groups can be made in accordance with any of the particular embodiments of anion exchange resins disclosed in U.S. Patents 2,591,573; 2,614,099; 2,900,352, and others. The strongly basic resins of commerce are generally of two chemical types. The so-called "type 1" resins are those aminated with trimethylamine whereas the "type 2" resins are aminated with dimethylethanolamine. The type 1 resins have a slightly higher basicity than the type 2 resins. Weakly basic resins can be made in accordance with procedures and examples described in U.S. Patents 2,151,883; 2,251,234; 2,341,907; 2,389,865; 2,591,574; 2,862,892, and others. Intermediate-base resins can also be employed. Examples of this type of resin are described in U.S. Patents 2,469,692; 2,610,156, and others. Those resins containing a high degree of porosity are preferred to the relatively low porosity variety.

Most commercial anion-exchange resins are made as discrete particles in the form of spherical or non-spherical granules, varying in particle size from about 0.15 mm. to about 2.0 mm. (10–100 mesh). In the desirable embodiment of this invention, continuous flow of the solution containing the ABS to be removed is effected through a vertical column containing a bed of the anion-exchange granules wherein the ABS is removed by adsorption or exchange. The preferred particle size for optimum hydraulic flow is in the 20–50 mesh range. Alternatively, the resin can be added to the solution, stirred, then removed by filtration or decantation. It is within the scope of this invention to use other physical forms of the resin. For example, the anion-exchange resin can be incorporated in a film, membrane, filter cloth, or filter aid and the solution containing the ABS to be removed passed through such a septum, thereby effecting removal.

The direction of flow of the liquid through the mass of solid anion-exchange resin is immaterial. For example, the liquid can go through a column of granules either down-flow or up-flow, desirably down-flow. Pressure flow may be effected in either case but in the case of down-flow, gravity flow alone is sufficient. Furthermore, the dimensions of the column are not critical although a minimum resin depth (in the direction of liquid flow) of about eight inches is preferred but not critical. The maximum height of such a column is limited only by the pressure drop which occurs in the flow of liquid through the column. In practice, resin column depths seldom exceed 6 feet. The column of resin granules need only be of such depth and the flow rate through the column need only be such that the ABS is substantially completely removed up to the capacity of the resin with substantially no leakage into the effluent leaving the column. Within limits, the greater the column depth, the faster the flow rate that can be employed without encountering leakage of the ABS into the effluent. With resin columns, flow rates in the range of 0.1 to 50 gallons per minute per cubic foot (g.p.m./cu. ft.) of resin may be employed. The preferred range is 1 to 10 g.p.m./cu. ft. If a film, membrane, or filter cloth is used, slower flow rates will be required compared to the same amount of anion-exchange resin in a column, in order to keep leakage of ABS into the effluent at a minimum.

The resin can be in a variety of ionic forms. The particular ionic state in which the resin is used is not critical insofar as removal of ABS is concerned, as the ABS is effectively removed when the resin is in the usual chloride, nitrate, sulfate, bisulfate or bicarbonate salt form, or in the hydroxide form. However, the resins in the chloride form are desirable because of their high capacity. Most commercial strongly basic anion-exchange resins are in the chloride form when shipped. Weakly basic resins are more frequently shipped in the free-base or hydroxide form. They can be used as is or they can be readily converted in the usual manner to the chloride form by treatment with hydrochloric acid.

In carrying out tests to determine the efficiency of ABS removal, the water containing this ingredient is passed through the column of resin. In order to determine qualitatively whether ABS is present in the effluent, a sample in a test tube is merely shaken to determine the presence or absence of foam. If none is present in the effluent, whereas a substantial foam is produced on shaking the influent, it can be concluded that the ABS is being effectively removed. Furthermore, any number of quantitative methods have been devised for determining ABS levels in water. One such method is described in The Journal of the American Water Works Association, volume 50, page 1343 (1958). This method comprises adding methylene blue to the solution containing ABS, thereby forming a blue-colored complex. The color is extracted with chloroform and measured in a Beckman DU-spectrophotometer. Such method is sufficiently accurate for the purposes in these tests.

The following examples are illustrative of the invention:

EQUILIBRIUM (SLURRY) TESTS

*Examples 1–4*

Initial tests were carried out in the simplest possible manner. Eight liters of tap water containing 2 p.p.m. of ABS (from "Tide") was prepared. When placed in a test tube and shaken, this water produced a durable froth. One liter was put into each of eight two-liter beakers. To each beaker was added one gram of the following commercially available anion-exchange resins: "Duolite A–7" (weakly basic amine type phenol-formaldehyde), "Duolite A–30B" (intermediate-base epoxy-polyamine type), "Duolite A–101D" (strongly basic polystyrene quaternary ammonium type 1) and "Duolite A–102D" (strongly basic polystyrene quaternary ammonium type 2). The tests were done in duplicate. The content of each beaker was stirred mechanically for two hours. The resin was allowed to settle in each of the beakers and a sample removed by decantation into a small test tube. Each tube was shaken and it was ascertained that the tendency to foam was gone in all cases.

COLUMN TESTS

*Examples 5–9*

In the next series of tests, the solutions at room temperature containing ABS were run down-flow through vertical columns of the resin particles and the results determined by analysis of the effluent.

Influent solutions were prepared by dissolving "Oronite D–40," a commercial detergent consisting of 40% ABS and 60% sodium sulfate, in tap water. This solution was run through each of 50 milliliter (ml.) resin beds contained in one-inch diameter glass tubes. The resins used were of standard particle size range, 20–50 mesh. The strongly basic resins, "Duolite A–101D," "Duolite A–102D" and "Duolite ES–111" (a highly porous analog of "Duolite A–101D") were treated with four bed volumes of 10% sodium chloride to convert them thoroughly to the chloride form, and rinsed free of excess chloride prior to use. The weak-base and intermediate-base resins, "Duolite A–7" and "A–30B" were treated with excess 2 N HCl and washed with water to constant pH for the same reason.

Analysis of the prepared influent indicated the following anionic composition:

ABS _____ 100 p.p.m. (as ABS)
Chloride _____ 26 p.p.m. (as CaCO$_3$)
Sulfate _____ 118 p.p.m. (as CaCO$_3$)
Bicarbonate _____ 40 p.p.m. (as CaCO$_3$)

The flow rate in each case was maintained at 2.5 gallons per minute per cubic foot of resin. Effluent samples after complete separation from the respective beds were analyzed periodically during the run. The results obtained are shown by the graph in the accompanying drawing.

In the drawing, the abscissa, "volume throughput, liters/ liter," represents the liters of water containing ABS passed through the bed per liter of the resin. The ordinate "ABS in effluent, p.p.m." represents the concentration in parts per million of ABS in the effluent. The operating capacity of each of the resins is indicated by the sharp increase in the amount of ABS in the effluent.

It will be noted that the A–101D resin, having the lowest capacity among those tested, still effectively removed ABS from nearly 50 volumes of influent per volume of resin before appreciable amounts of the ABS were found in the effluent, commonly known in the ion exchange art as "breakthrough." The highest capacity resin tested, A–102D, was effective for nearly 600 volumes of influent per volume of resin before breakthrough. Thus, by calculation, the A–102D resin removed about 60 grams of ABS before exhaustion, while the least effective resin, A–101D, removed about 5 grams of ABS.

The fact that a low capacity resin removes less ABS per unit volume of resin does not impair the efficacy of the process insofar as removal of ABS is concerned, but it is desirable to employ as high a capacity resin as is commercially economical because less frequent regeneration of the resin is required upon exhaustion thereof.

The rate of removal of the ABS is increased at elevated temperature; and therefore, higher flow rates through a column can be effected if the liquid from which the ABS to be removed is heated. Any temperature below the boiling point of the water is suitable; and if desired, room temperature or even lower can be employed. In this connection, it has been found that removal of the ABS from a slurry of the water containing the ABS and the resin is also achieved more rapidly at elevated temperatures.

EFFECT OF INFLUENT SALT CONCENTRATION

Examples 10–13

Tests were performed in order to determine the effect of mineral salt concentration on the removal of ABS by "Duolite A–102D" when both such salts and ABS are in the same solution.

Influent solutions were prepared by adding ABS ("Oronite D–100") and salts (NaCl and MgSO$_4$) to deionized water. The amount of ABS was 10 p.p.m. in all the prepared solutions. Quantities of chloride and sulfate were added to make levels corresponding to 10, 100, 200, and 300 p.p.m. sulfates and chlorides (combined), all expressed as CaCO$_3$. Fifty ml. of standard commercial "Duolite A–102D" was put into each of four one-inch glass tubes and backwashed with water prior to the runs. The four solutions containing different amounts of salt and the ABS were passed at room temperature through these columns at a rate of two gallons per minute per cubic foot of resin and the effluents analyzed for ABS contents periodically. The results are shown in the following table:

| Example No. | Influent Salt Conc., p.p.m. | Avg. ABS in Effluent | Bed Volumes Treated to Breakthrough |
|---|---|---|---|
| 10 | 10 | 0.1 | 13,000 |
| 11 | 100 | 0.1 | 12,500 |
| 12 | 200 | 0.1 | 13,500 |
| 13 | 300 | 0.1 | 13,000 |

Thus it can be seen that the salt content had little effect on the removal of ABS by the resin.

From the preceding, it is seen that the capacity of the anion-exchange resin for the ABS is relatively immaterial insofar as functional removal of the ABS is concerned. However, higher capacity resins can be employed longer before they become exhausted, as is indicated by the aforementioned "breakthrough" points on the graph. The flow rate through the resin bed is also relatively immaterial and can vary within wide limits depending on the volume of resin, the particular character of the resin and the temperature. The amount of ABS in the water to be removed can also vary within wide limits.

With respect to the usual waters containing ABS in solution as an undesirable constituent in the presence of other usually occurring salts, such as well water and tap water sources into which leakage of ABS has occurred, and industrial waste water, domestic sewage water and streams into which ABS has been discharged, the amount of ABS may vary from as low as 0.1 p.p.m. in the case of a tap water source to as high as 10.00 p.p.m. in the case of sewage water. The effluent water from laundries having automatic washing machines, widely used directly by the public, may contain as high as 100 p.p.m. ABS. For any particular type and amount of resin in the resin bed, and particular amount of ABS in the influent to be treated, one can readily ascertain a suitable flow rate by testing for amount of ABS, if any, in the effluent and adjusting the flow rate accordingly.

ELUTION OF ABS FROM RESIN

In some instances, an exhausted column of resin can be discarded and replaced by a column of new resin. However, in other instances, it would be desirable from an economic point of view to be able to use the column of anion-exchange resin repeatedly for the removal of ABS. For this reason, considerable effort was made to find a method of regeneration following exhaustion.

Because of the high affinity of the ABS for the resin, regeneration is not easily achieved by usual regeneration methods for anion-exchange resins heretofore employed. All efforts to elute it with solutions of inorganic reagents were to no practical avail. Attempts were made with dilute and concentrated solutions of sodium hydroxide, ammonium hydroxide, sodium chloride, hydrochloric, sulfuric and phosphoric acids, trisodium phosphate, sodium tetraborate, sodium sulfite and sodium hydrosulfite at temperatures up to and including boiling temperature. In all cases, the amount of ABS removed from the resin was less than 5% of the amount adsorbed. Even oxidizing solutions, such as sodium hypochlorite, hydrogen peroxide and chloric acid were without significant effect, although considerable resin bleaching was observed. Large quantities of nitric acid at concentrations ranging from 1 to 12 Normal eluted some of the ABS when applied at elevated temperatures, but this method was found impractical because of the large volume required and the potential for resin oxidation.

Following all of the efforts outlined above, it was found that ABS could be removed from the resin by washing the resin bed with combinations of polar solvents, such as lower alcohols or ketones, and dilute mineral acids in proportions of about 1 part of polar solvent to about 0.1 to 10 parts of acid of between 0.1 and 6 Normal, and desirably at an elevated temperature of about 40° to 60° C., but the temperature is not critical; nor is the concentration of the acid critical. Examples of polar solvents which proved practical for such application are methanol, n-propanol, isopropanol, n-butanol, sec-butanol, isobutanol, acetone and methylethylketone. The use of such mixtures is shown in the following examples.

*Example 14*

A 50-ml. column of A–102D in a one inch inside diameter (I.D.) glass tube was exhausted with ABS. By analysis of influent and effluent solutions, it was determined that the resin column removed about nine grams of ABS. A mixture of 50-ml. of acetone and 50-ml. of 1 N HCl was mixed and warmed to about 45° C., then immediately passed through the A–102D at a rate of 1 gallon per minute per cubic foot. Analysis of the effluent for ABS indicated that about 8.1 grams (90%) was removed from the resin by this treatment.

The column was then rinsed with deionized water to a pH of 5.5, following which another ABS run was made. The influent consisted of tap water to which 10 p.p.m. ABS was added. The flow rate was set at 2.0 g.p.m. per cubic foot and again the effluent was analyzed periodically, continuing the run to a breakthrough value of 1.5 p.p.m. ABS. As a result, the resin was found to adsorb about 8 grams of ABS. The above procedure was repeated three more times and each time the removal was found to be about 8 grams of ABS, evidencing that this procedure could be used repeatedly with no further loss in capacity following the first regeneration.

*Example 15*

A 100-ml. column of "Duolite A–7" was exhausted with ABS as previously described. Analysis of influent and effluent solutions indicated that the resin adsorbed about 13 grams of ABS.

Following exhaustion, the resin was regenerated with a mixture consisting of 100 ml. of methanol and 100 ml. of 1 $NH_2SO_4$, the mixture being heated to 50° C. prior to the resin treatment. By this treatment, 11.5 grams of ABS was eluted.

The column was rinsed with deionized water and another run was made with an influent containing 10 p.p.m. of ABS in tap water. The resin was found to adsorb 11.3 grams of ABS to a breakthrough level of 1 p.p.m.

Regeneration and exhaustion were repeated twice more with similar results.

*Example 16*

The following example is illustrative of an embodiment of the invention for removal of ABS from previously filtered sewage disposal water.

Provide a bed of strongly basic anion-exchange resin granules in the chloride form made in accordance with Example 1 of U.S. Patent 2,900,352, and of about 20–50 mesh. This bed can be placed in any suitable commercial ion-exchange column. The resin bed depth in a typical column is about 3 ft. and the diameter about 8 inches, providing about one cubic foot of resin in the bed. With about 2 p.p.m. ABS in the filtered sewage water, pass the solution downflow through the bed at about 2 gallons per minute. About 1,200,000 gallons of the ABS-containing water can be passed through the bed before exhaustion of the resin.

After exhaustion, regeneration of the resin can be effected as follows:

In a 50-gallon ceramic or rubber-lined tank, mix 10 gallons of water, 1 gallon of 22° Baumé hydrochloric acid, and 15 gallons of commercial grade methanol. Begin flow downward through the resin bed at a rate of 0.5 gallon per minute. When all of the acid-alcohol mixture has been put into the ion-exchanger tank, begin flow of rinse water and continue at the same flow rate for 10 minutes. Then increase rinse rate to 3 gallons per minute and continue rinse for 30 minutes more. The entire regeneration takes about 95 minutes.

I claim:

1. The method of removing alkyl benzene sulfonate dissolved in a body of water, which comprises effecting intimate contact between the water body and an anion exchange resin without prior removal of cations which may be present in said water to extract said sulfonate from the water by said resin and thereby substantially prevent foaming of the water caused by said sulfonate.

2. The method of removing alkyl benzene sulfonate dissolved in a body of water also containing the usual salts present in natural waters dissolved therein, which comprises effecting intimate contact between the water body and an anion exchange resin having a greater affinity for said sulfonate than for said salts without prior removal of cations which may be present in said water, to extract said sulfonate from the water in preference to said salts and thereby substantially prevent foaming of the water otherwise caused by said sulfonate.

3. The method of claim 2 wherein the resin is in the form of particles, and said intimate contact is effected in a slurry of the water body and said particles.

4. The method of claim 2 wherein the resin is in the form of particles, and said intimate contact is effected by effecting continuous flow of the water body through a bed of said resin.

5. The method of claim 2 wherein the water body is a member of the group consisting of tap, stream, well, industrial waste and laundry effluent water.

6. The method of removing alkyl benzene sulfonate dissolved in a body of water also containing the usual salts present in natural waters dissolved therein, which comprises providing a bed of particles of a quaternary ammonium anion exchange resin having a greater affinity for said sulfonate than for said salts to extract said sulfonate from the water in preference to said salts, and effecting flow of the water body through said bed, without prior removal of cations which may be present in said water.

7. The method of precluding impairment of the sewage disposal process caused by the presence of alkyl benzene sulfonate contained in sewage water, which comprises providing a bed of particles of an anion-exchange resin, and effecting flow of said sewage water through said bed to extract said sulfonate from the sewage water by said resin.

8. The method of removing alkyl benzene sulfonate dissolved in a body of water, which comprises effecting intimate contact between the water and an anion-exchange resin to extract said sulfonate from the water by said resin and thereby substantially prevent foaming of the water caused by said sulfonate, and subsequently regenerating the resin to remove said sulfonate therefrom by treatment thereof with a polar solvent and a dilute mineral acid.

References Cited in the file of this patent

UNITED STATES PATENTS

Re. 24,213    Van Blaricom et al. _____ Sept. 11, 1956

OTHER REFERENCES

Text (I), "Surface Active Agents," by Swartz and Perry, copyright 1949, by Interscience Publishers Inc., pages 120–131 relied upon. (Copy in Scientific Library.)

Text (II), Surface Active Agents and Detergents, vol. II, by Swartz, Perry and Berch, copyright January 1958, by Interscience Publishers, Inc., pages 100–102 relied upon. (Copy in Group 170.)

Ginn et al.: "New Columnar and Mixed-Bed Ion-Exchange Methods for Surfactant Analysis and Purification," Analytical Chemistry, 31, 551–5 (1959). (Copy in Division 59.)